Figure 17:
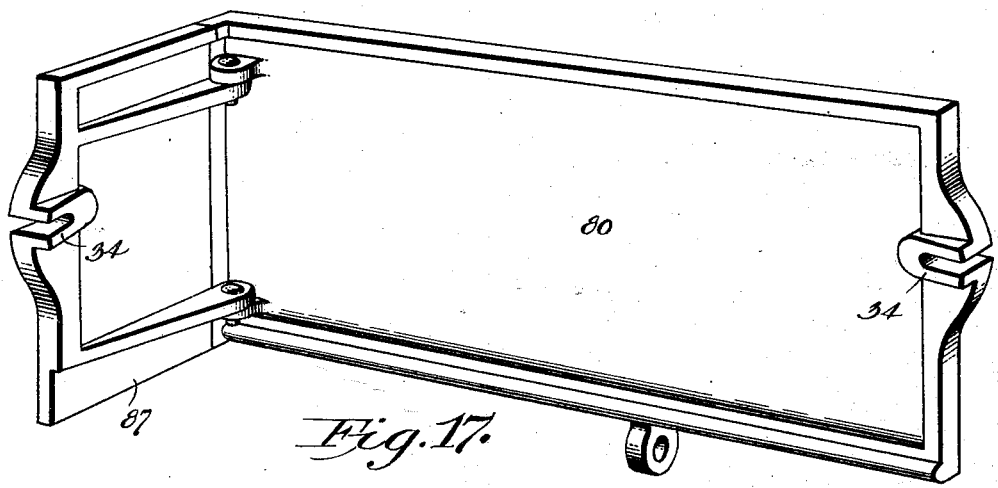

No. 727,427. PATENTED MAY 5, 1903.
H. S. PALMER.
MACHINE FOR MOLDING HOLLOW CONCRETE BUILDING BLOCKS.
APPLICATION FILED MAY 29, 1902.
NO MODEL. 6 SHEETS—SHEET 1.
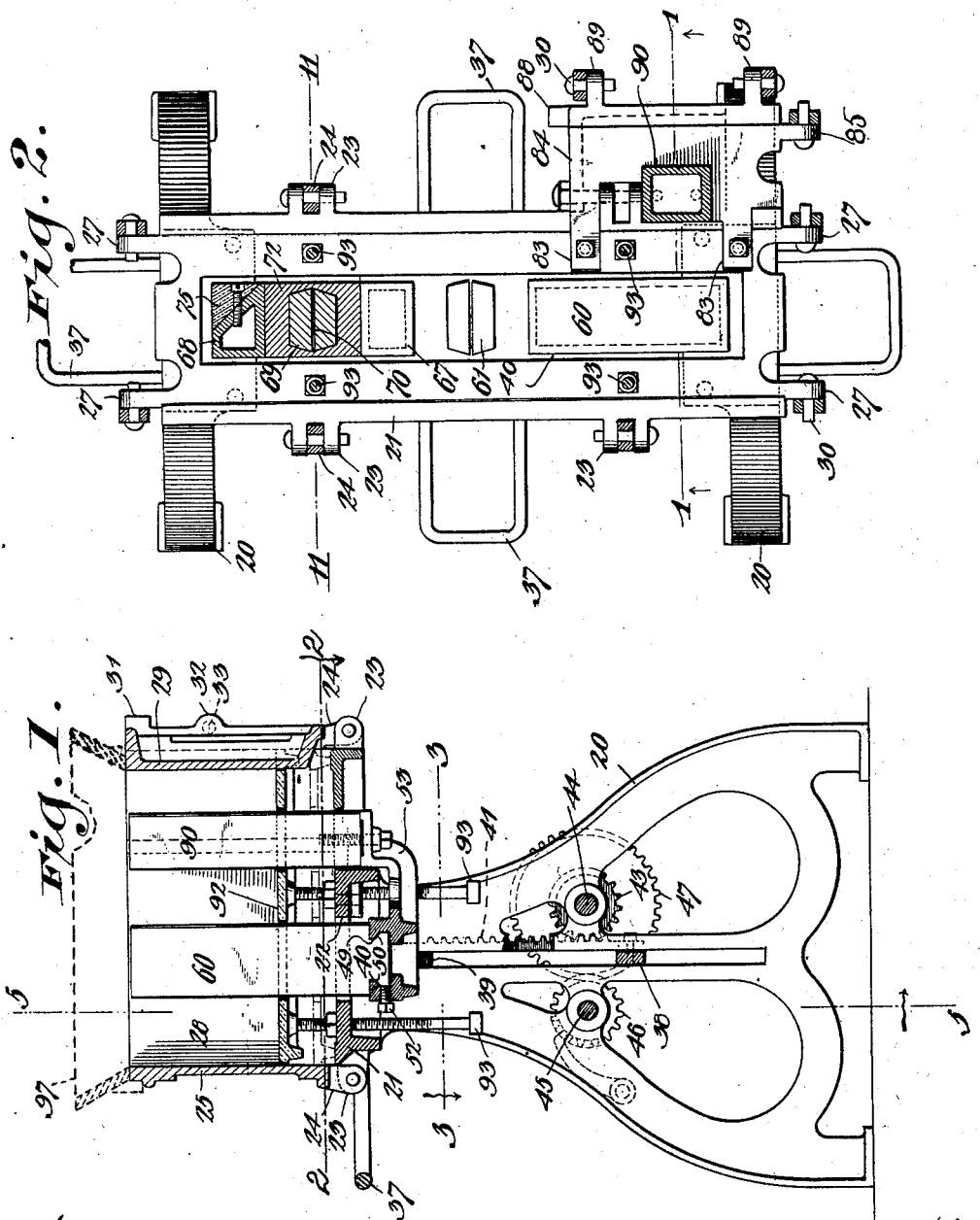

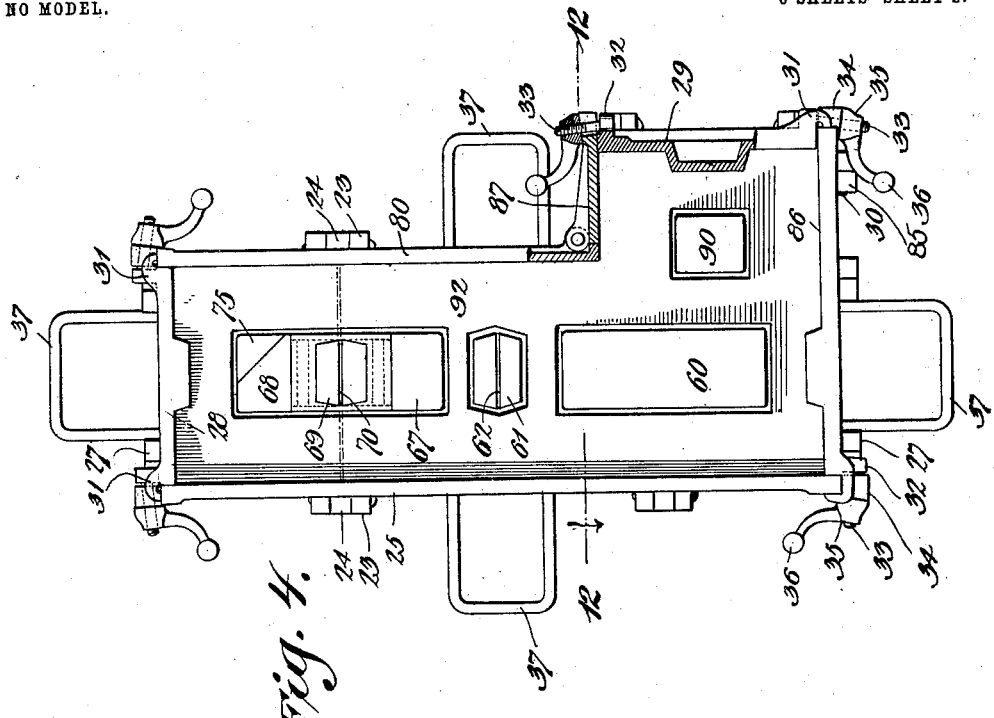

No. 727,427. PATENTED MAY 5, 1903.
H. S. PALMER.
MACHINE FOR MOLDING HOLLOW CONCRETE BUILDING BLOCKS.
APPLICATION FILED MAY 29, 1902.
NO MODEL. 6 SHEETS—SHEET 3.
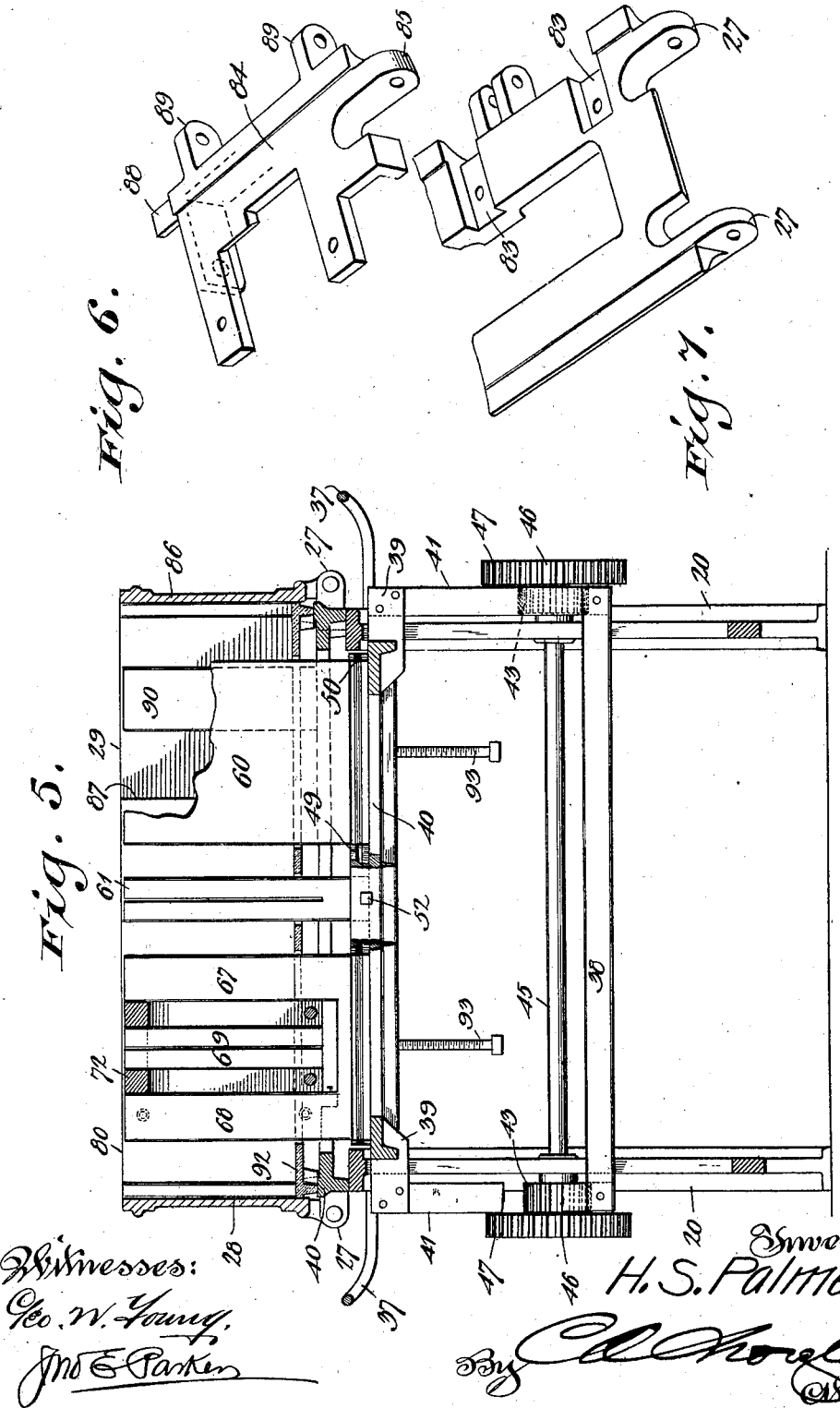

No. 727,427. PATENTED MAY 5, 1903.
H. S. PALMER.
MACHINE FOR MOLDING HOLLOW CONCRETE BUILDING BLOCKS.
APPLICATION FILED MAY 29, 1902.
NO MODEL. 6 SHEETS—SHEET 4.
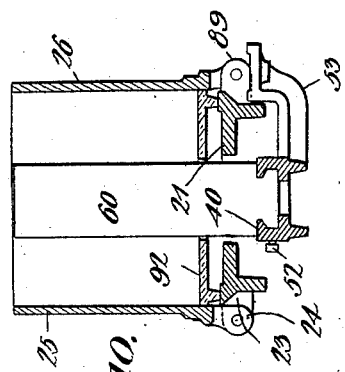
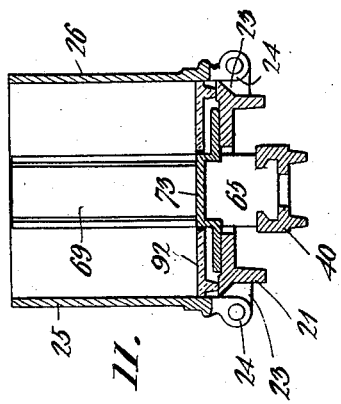
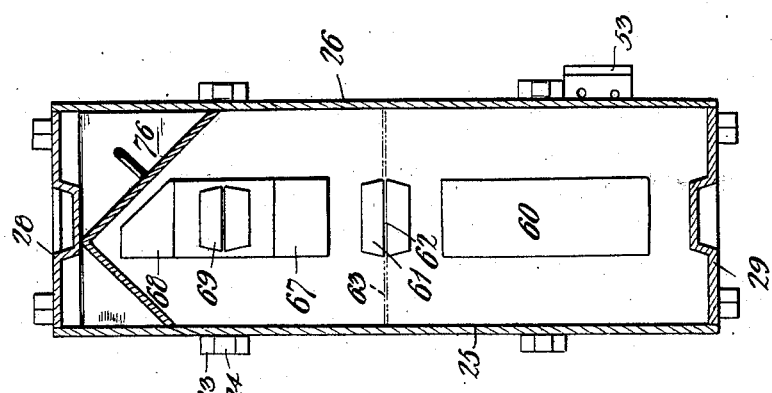
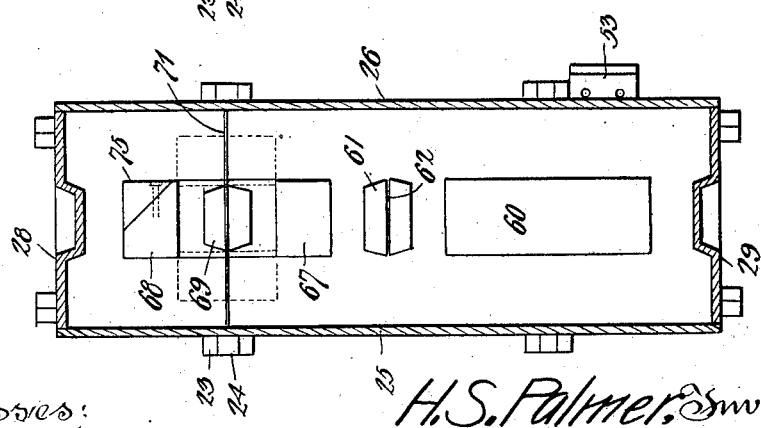

No. 727,427. PATENTED MAY 5, 1903.
H. S. PALMER.
MACHINE FOR MOLDING HOLLOW CONCRETE BUILDING BLOCKS.
APPLICATION FILED MAY 29, 1902.
NO MODEL. 6 SHEETS—SHEET 5.
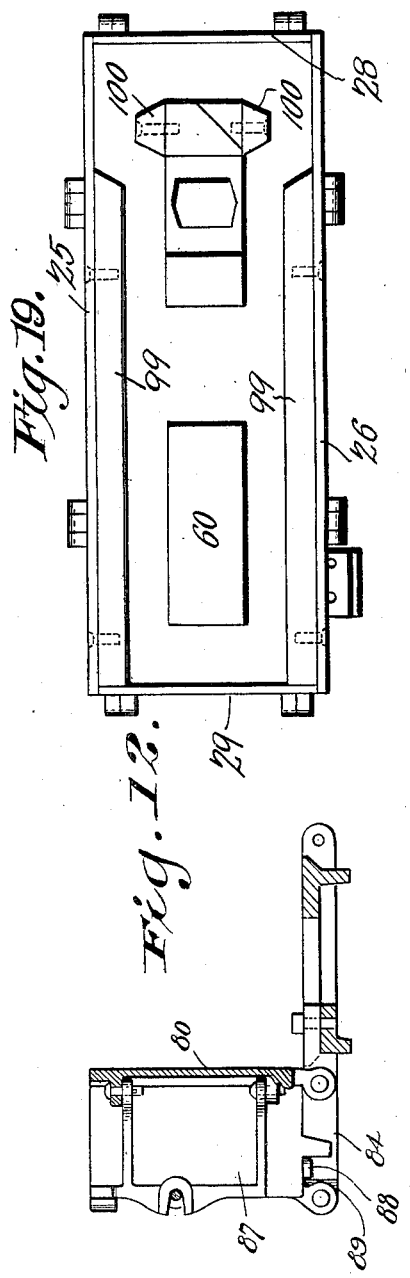
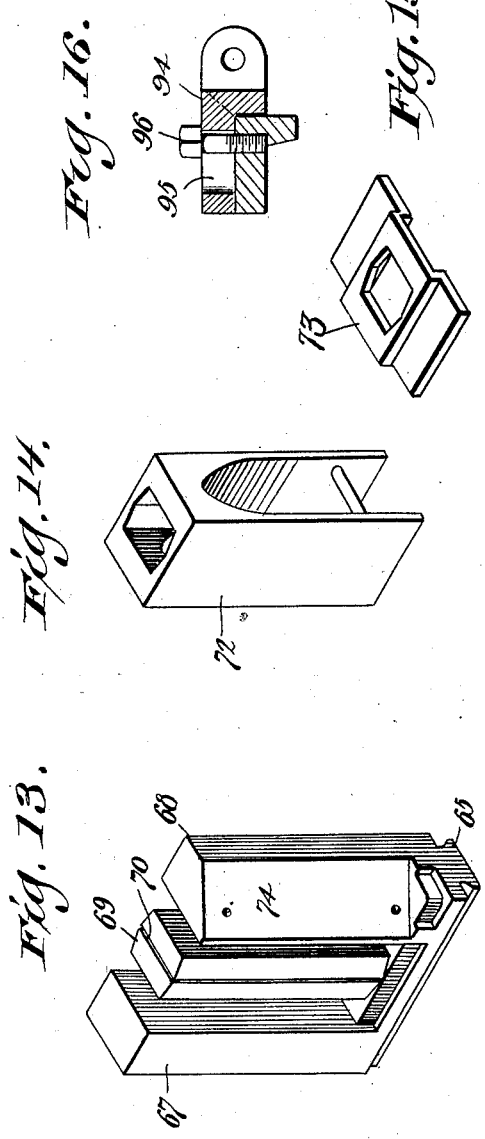

No. 727,427. PATENTED MAY 5, 1903.
H. S. PALMER.
MACHINE FOR MOLDING HOLLOW CONCRETE BUILDING BLOCKS.
APPLICATION FILED MAY 29, 1902.
NO MODEL. 6 SHEETS—SHEET 6.

Witnesses
H. S. Palmer, Inventor.
by C. A. Snow & Co.
Attorneys

No. 727,427.

Patented May 5, 1903.

UNITED STATES PATENT OFFICE.

HARMON S. PALMER, OF WASHINGTON, DISTRICT OF COLUMBIA, ASSIGNOR TO HARMON S. PALMER HOLLOW CONCRETE BUILDING BLOCK COMPANY, OF ALEXANDRIA, VIRGINIA, A CORPORATION OF VIRGINIA.

MACHINE FOR MOLDING HOLLOW CONCRETE BUILDING-BLOCKS.

SPECIFICATION forming part of Letters Patent No. 727,427, dated May 5, 1903.

Application filed May 29, 1902. Serial No. 109,550. (No model.)

*To all whom it may concern:*

Be it known that I, HARMON S. PALMER, a citizen of the United States, residing at Washington, in the District of Columbia, have invented a new and useful Machine for Molding Hollow Concrete Building-Blocks, of which the following is a specification.

This invention relates to certain improvements in mechanism of that class employed in the manufacture of building-blocks from concrete and similar materials, and has for its principal object to provide an improved machine whereby blocks of any desired shape and size may be made with less time and labor than with the mechanisms ordinarily employed for the purpose.

A further object of the invention is to so construct the machine that it may be employed for the manufacture of corner-bricks and for bricks in which the exposed faces are arranged at different angles, as employed for bay-windows and similar structures, as well as to manufacture bricks of the ordinary type, and a further object is to provide for the adjustment of the parts in such manner as to permit the manufacture of bricks in half, quarter, and other sections and to vary the size of such bricks as may be required in length or width.

A still further object of the invention is to provide for the adjustment of the cores both as to shape and size and to further provide for the adjustment of the cores to any desired point within the mold-box.

A still further object of the invention is to provide for the more secure interlocking of the movable sides and ends of the mold-box and at the same time permitting the ready adjustment of such securing devices to locked and unlocked positions.

A still further object of the invention is to provide for the employment of removable bottom plates of non-corrosive material which when the blocks are stored for tempering or drying will not combine with the oxid usually formed on the metallic supporting-plates in ordinary use.

With these and other objects in view the invention consists in the novel construction and arrangement of parts hereinafter described, illustrated in the accompanying drawings, and particularly pointed out in the appended claims.

Figure 18:
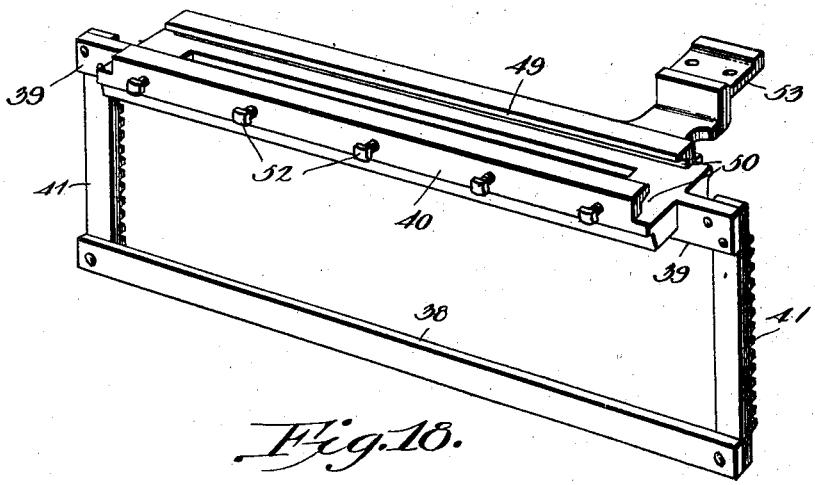

In the drawings, Figure 1 is a longitudinal sectional elevation, on the line 1 1 of Fig. 2, of a machine for molding building-blocks constructed in accordance with my invention. Fig. 2 is a sectional plan view of the same on the line 2 2 of Fig. 1. Fig. 3 is a plan view of the machine, partially in section, on the line 3 3 of Fig. 1. Fig. 4 is a plan view of the machine with the parts assembled for the formation of a corner-block, a portion of the side of the mold-box being broken away in order to more clearly illustrate the construction of the securing devices. Fig. 5 is a longitudinal sectional elevation of the machine on the line 5 5 of Fig. 1. Figs. 6 and 7 are detail perspective views of a pair of brackets which are bolted to the machine when the latter is to be employed for the manufacture of corner-bricks. Fig. 8 is a sectional plan view of the mold-box as arranged for the formation of a quarter-size and a three-quarter-size brick. Fig. 9 is a similar view of the mold-box as arranged for the formation of an angular brick which is used at the corners of bay-windows. Fig. 10 is a detail sectional view showing a portion of the mold-box on the same plane as that in which Fig. 1 is taken, the box, however, being adjusted for the manufacture of brick of the usual type. Fig. 11 is a detail sectional view of a portion of the mold-box on the line 11 11 of Fig. 2. Fig. 12 is a detail sectional view of a portion of the mold-box looking in the direction of the arrow 12 12 of Fig. 4. Figs. 13 and 14 are detached perspective views of a form of core which may be employed for a variety of purposes. Fig. 15 is a detail perspective view of a core-plate which may be employed when the core-sections shown in Figs. 13 and 14 are assembled to form a solid core as shown in Figs. 4 and 11. Fig. 16 is a detail sectional view illustrating a form of adjustable lug for the support of the side and end plates when it is desired to form bricks of different width and length. Fig. 17 is a detailed perspective view of the removable side plate employed when the mold-box is adjusted for the manufacture of bricks of the ordinary character. Fig. 18 is a detailed perspective view of the core-carrying bar. Fig. 19 is a plan view of a mold, illustrating the employment of auxiliary sections for changing contour of block, whereby different sizes of cores and side plates may be used to reduce or increase the size of the blocks for pilasters, chimneys, &c.

Similar numerals of reference are employed to indicate corresponding parts throughout the several figures of the drawings.

The main frame of the machine comprises opposite end standards 20 and an upper flanged bed-plate 21, the latter being provided with a longitudinally-disposed opening 22, extending for the entire length of the bed-plate between the inner faces of the standards to permit of the adjustment of the cores to any desired position in the length of the mold-box. The bed-plate is provided on each of its sides with pairs of lugs 23, to which are pivoted depending lugs 24, carried by the swinging side plates 25 and 26 of the mold-box, and at the ends of the bed-plate are similar lugs 27, to which are pivoted the end plates 28 and 29, the latter being arranged in such manner that its pivot-pintles 30 may be readily removed when it is desired to adjust said plate to the position indicated in Figs. 8 and 9 or the position shown in Figs. 1 and 4, the latter being the position assumed when the machine is adjusted for the manufacture of corner-bricks.

The end plates 28 and 29 extend partly within the space between the opposite side plates 25 and 26, and each of said end plates is provided with lugs 31, which prevent excessive inward movement of said plates by coming into contact with the end walls of the side plates. The end plates are provided at each side with outwardly-projecting lugs 32, to which are rigidly secured the threaded bolts 33, all of such bolts being inclined at an angle to the line of the end plates and extending through slotted lugs 34, carried by the side plates of the box. The outer faces of the lugs 34 are inclined at an angle to the line of said side plate, as shown more clearly in Fig. 4, the outer faces of said lugs being substantially in a plane at right angles to the longitudinal axes of the bolts 33. The bolts are adapted for the reception of nuts 35, having projecting arms or handles 36, by which they may be readily turned to engage the inclined faces of the lugs 34, and when so engaged the end plates will be positively locked in place and any outward movement will be prevented, while the side plates are held in position by the clamping action of the nuts on the bolts carried by the fixed lugs 32 of the end plates. The degree of inclination of the outer faces of the lugs 34 and the bolts need not be excessive, a very slight angle being sufficient to produce a wedging effect and holding the end plates against outward movement more firmly as the pressure on such plates is increased. When the plates are being released, the nuts are loosened to an extent sufficient to permit their passage beyond the inclined faces of the lugs, after which all of the plates may be swung down to horizontal position, suitable supports 37 being carried by the bed-plate to prevent excessive downward movement.

The end standards 20 are provided with vertical guiding-slots for the reception of a cross-bar 38 and the outwardly-projecting arms 39 of a core-carrying bar 40, the cross-bar and arms 39 being rigidly secured together at points outside the slotted frames by rack-bars 41, adapted to intermesh with pinions 43, mounted on a shaft 44, adapted to suitable bearings in the standards. In said standards are also formed bearings for the reception of a shaft 45, provided at its opposite ends with pinions 46, which intermesh with gears 47, secured to the shaft 44, and said shaft 45 is further provided with an operating-crank 47' or a suitable belt or power-wheel which may be turned to impart a vertical reciprocating movement to the core-carrying bar through the medium of the gears and rack-bars.

The core-bar is of approximately the same length as the bed of the machine and comprises two side members spaced by an elongated slot 49, the adjacent faces of such members being provided with dovetail guides 50, adapted to receive the correspondingly-shaped lower ends of the cores. The cores, which may be of any contour, are carried by the core-bar and adjustable longitudinally thereof, suitable set-screws 52 being employed to lock the cores in any position to which they may be adjusted. The core-carrying bar is provided at a point near one end with a laterally-extending arm 53, to which may be secured a core to be employed when the machine is adjusted for the manufacture of a corner-brick. During the process of manufacture of other forms of brick this core-bar section is not in use.

The cores employed in the manufacture of the bricks are of a size and character depending on the contour of the brick to be made, and in making a brick of ordinary character it is preferred to employ three cores, two of which may be of a contour similar to that shown at 60 in Figs. 4 and 8 and an intermediate core-section 61, the latter being located centrally between the end plates and provided with a transversely-disposed slot 62, in which may be placed a division-plate 63, as indicated by dotted lines in Fig. 9. This arrangement permits of the manufacture of half-bricks having bonding-recesses at opposite ends and a central opening formed by the larger core-section.

In one end of the mold-box is situated a core of the character more clearly shown in Figs. 13, 14, and 15 and comprising a base 65, adapted to the dovetail guides of the carrier-bar and provided with three upwardly-projecting core members 67, 68, and 69, the latter being provided with a transversely-disposed slot 70, in which may be placed a division-plate 71, as indicated in Fig. 8, when it is desired to form brick sections of shorter or longer length than a half-section, and quarter and three-quarter sections or any desired fractional part of a brick may thus be made by adjusting the core longitudinally of the bar, and thus placing the division-plate 71 at the required point intermediate of the end plates. In order to provide for the formation of a practically solid core of the character shown at 60, I employ a filling-block 72, having a central orifice adapted to fit snugly around the section 69, the body of the filling-block being so shaped as to fill in the spaces between the various members 67, 68, and 69 and to form a practically solid core. When the core is used in this form, it is preferable to employ a bottom plate 73 of the character shown in Fig. 15, this plate being provided with a central opening of a contour corresponding to that of the core-section 69 and being first placed over the core member 69 and forming a bottom support for the filling-block 72.

In order to provide for the formation of bricks in which the ends are disposed at other than a right angle to the sides, the member 68 of the core is provided with an inclined surface 74, arranged at an angle corresponding to that at which the face of the brick is to be formed, and to this face is secured an angular block 75 to preserve the normally rectangular contour of this member of the core. When section 75 is removed, an angular plate 76 is placed in the mold-box in such position that one side will be parallel with the angular face of the core-section, and the ends of the plate will be supported by the movable side and end plates of the mold-box. When the angular plate 76 is used, a division-plate may be placed at 63 to form bricks in half-section, or the whole of the area of the mold-box may be employed between the angular plate and the end plate 29 for the formation of a complete brick.

In machines of this class as ordinarily constructed it is impossible to adjust a machine for the manufacture of both rectangular and corner bricks, the bricks of the latter class being provided with a laterally-extended portion at one end in order to provide for the proper bonding of the brickwork. To accomplish this work, the core-bar is provided with the lateral arm 53 and the side plate 26 and end plate 29 are made removable, the side plate being replaced by another shorter plate 80 of the character more clearly shown in Figs. 4 and 12, while the end plate is adjusted to the position indicated in Figs. 1 and 4 to form the end of the shorter portion of the corner-brick.

Near one end of the bed-plate are two recesses 83, adapted for the reception of the inwardly-projecting ends of a bracket 84. The bracket 84 is provided with a projecting lug 85, which is adjusted to a position in alinement with the bed-plate lugs 27, the three lugs serving as supports for an end plate 86, which is provided at one end with an inclined lug 34 of a character similar to that carried by the side plates, while at the opposite end said plate is provided with a lug 32 and bolt 33 of a construction similar to that carried by the end plates 28 and 29.

The side plate 80 employed in the formation of the corner-bricks is much shorter in length than the side plate 26 and at one end is provided with a hinged section 87, which may be turned to a position at right angles to the side plate 80, this plate and its section 87 forming what may be termed the "inner" faces of the brick. The outer portion of the plate-section 87 is partly supported by a lug 88, projecting from one end of the bracket 84, as shown more clearly in Fig. 6.

The bracket 84 is provided with a pair of lugs 89, properly spaced for the reception of the pivot-lugs of the end plate 29, said plate being readily removed and adjusted to position to form the end of either a rectangular or a corner block. When the parts are adjusted in position to form a corner-block, a suitable core 90 is bolted or otherwise secured to the arm 53 of the core-carrying bar 40 and is reciprocated with said bar by means of the operating-gearing.

In the lower portion of the mold-box is placed a removable plate 92 of a contour corresponding to that of the box and provided with suitable openings for the passage of the cores which form the central openings in the blocks and the cross-sections which form the bonding-recesses at the ends of the blocks, the cross-sections in the latter case being carried either by the end plates of the mold or by the pawl-carrying bar 40. A number of removable plates 92 are employed to suit the different adjustments of which the machine is capable. The removable bottom plates, which are taken from the mold-box with the completed bricks, are formed of non-corrosive material, such as galvanized iron, to prevent the combination of the calcareous matter in the bricks with the oxid from the iron of which these plates are usually formed. This is of considerable importance in the manufacture of bricks from concrete, where much damage results from the discoloration of the bricks when kept for any length of time in contact with unprotected iron plates.

In the bottom of the mold-box are formed threaded openings for the passage of adjustable screws 93, which may be arranged with their wrench-engaging heads either inside or outside of the box and serve to support the removable bottom plates 92, the adjustment of these plates permitting the formation of blocks of different thickness.

As the removable bottom plates are always disposed in a horizontal plane somewhat above the plane of the bed-plate of the machine, the transferring-hooks which are used to convey the plate and molded block from the machine can be more readily engaged with the under side of said removable plates than where the bottom plate rests directly on the bed-plate and is provided with notches for the reception of said hooks, as in some classes of machines employed for molding blocks of this character.

Further adjustment of the mold-box is provided for by making the pivot-lugs for the support of the side and end plates of separate blocks of metal, as indicated at 94 in Fig. 16, said blocks being slotted, as indicated at 95, for the passage of locking-screws 96 and permitting of the adjustment of the side and end plates toward and from each other, and thus provide for the manufacture of blocks of different length and width.

In the manufacture of the bricks the mold-box is first adjusted to the desired contour and the cores are placed in the elevated position. A hopper 97, such as indicated in dotted lines in Fig. 1, is then placed on the top of the mold-box and the concrete is filled in and tamped between the sides of the box and the cores. The hopper is then removed and the top of the concrete troweled and all surplus material removed. The cores are then lowered by means of the gearing, and the side and end plates are unlocked and turned to the horizontal position, where they rest upon the support 37 during the removal of the bottom plate and the block. A new bottom plate is then placed in position and the parts readjusted for a second and similar operation.

In some cases it may be desired to manufacture bricks of special contour and size for building pilasters and other ornamental work, and the machine forming the subject of the present invention is so constructed that blocks of any desired shape and size may be made by the addition of auxiliary plates adapted to fit against the sides or ends and the cores of the machine, as illustrated in Fig. 19. This figure shows reducing-plates 99, secured to the sides of the mold in order to change the contour of the block, while the core-section is provided with auxiliary plates 100 for increasing the area of the opening in the block. These auxiliary plates may be of any desired shape and size and may be secured in position by screws or bolts in order to permit the manufacture of a brick or block of any shape.

The adjustability of the cores, both as regards their changes in contour and the longitudinal movement on the core-carrying bar, permits of the use of a single machine for the manufacture of bricks or blocks of any desired size or contour.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described the invention, what I claim as new is—

1. In a machine for forming hollow concrete blocks, the combination with a mold-box having movable sides, of a reciprocating core, mechanism for operating the core, a removable bottom plate having openings for the passage of the core, and means for vertically adjusting and holding said bottom plate in different horizontal planes to vary the thickness of the block.

2. In a machine for forming hollow concrete blocks, the combination with a mold-box having movable side and end plates, of a reciprocating core, means for operating the core, a removable bottom plate having openings for the passage of the core, and adjustable screws carried by the bottom of the mold-box and serving to support said removable bottom plate.

3. In a machine for forming hollow concrete blocks, the combination with a bed-plate having a removable bracket, of interchangeable side and end plates adjustable for the formation of blocks of different contour, a reciprocating core, means for operating the same, and a removable bottom plate having an opening for the passage of said core.

4. In a machine for forming hollow concrete blocks, the combination with a bed-plate having a laterally-extended bracket, of a plurality of interchangeable side and end plates adjustable to form a mold-box of varying contour, a movable core, means for operating the same, and interchangeable bottom plates having openings for the passage of said core.

5. In a machine for forming hollow concrete blocks of varying contour, the combination with a bed-plate, of a detachable bracket connected thereto, movable side and end plates, means for locking the side and end plates together to form a mold-box, auxiliary detachable plates carried by the bracket and adjustable to form a mold-box of different contour, vertically-movable cores, means for operating the same, and interchangeable bottom plates having openings for the passage of said cores.

6. In a machine for forming hollow concrete blocks, a bed-plate, a removable bracket adapted to be connected to the bed-plate, pivot-lugs carried by the bed-plate and bracket, and interchangeable side and end plates adapted to the pivot-lugs to form mold-boxes of varying contour.

7. In a machine for forming hollow concrete blocks, the combination with the bed-plate, of a bracket, means for removably securing the bracket to the bed-plate, pivot-lugs carried by the bed-plate and bracket, a plurality of movable side and end plates supported by said pivot-lugs and adjustable to form mold-boxes of varying contour, a core, means for vertically reciprocating the same, and a removable bottom plate having an opening for the passage of said core.

8. In a machine for forming hollow concrete blocks, the combination with a bed-plate, of a removable bracket, means for securing the bracket to the bed-plate, pivot-lugs carried by said bracket and bed-plate, movable side and end plates carried by the pivot-lugs of the bed-plate, a removable end plate adapted to be supported by the pivot-lugs of the bed-plate or by those of the bracket, a removable side plate adapted to the pivot-lugs of the bed-plate, and an auxiliary box-section adapted to be supported partly by the bed-plate and partly by the bracket.

9. In a machine for forming hollow concrete blocks, the combination of a bed-plate, a detachable bracket adapted to be secured thereto, movable side and end plates carried by the bed-plate and adjustable to form a substantially rectangular block, and auxiliary side and end plates interchangeable with the movable side and end plates and adapted to be supported by the bed-plate and the bracket to thereby adapt the mold-box for the formation of corner-blocks or blocks of different contour.

10. In a device of the class specified, a bottom plate, movable side and end plates arranged in sets, inclined bolts carried by one set of plates, slotted lugs carried by the other set of plates and provided with inclined faces, and securing-nuts adapted to the bolts and adjustable toward and from said inclined faces.

11. In a device of the class specified, the combination with a bottom plate, of the movable side and end plates, and a securing device arranged at the juncture of each two plates, said securing device comprising an inclined bolt rigidly secured to one plate, a slotted and tapering lug carried by the adjacent plate, and a lock-nut carried by the bolt and adapted to engage the tapered face of said lug.

12. In a device of the class specified, a securing device arranged at the intersection of two movable plates and comprising a slotted tapering lug carried by one plate, a bolt rigidly secured to the second plate and inclined at an angle thereto, and a handled nut carried by and adjustable on said bolt, said nut engaging the tapered face of the lug and the resistance to opening being thus increased in proportion to the pressure exerted.

13. In a device of the class specified, the combination with the movable side and end sections arranged to form a mold-box, of a core-carrying bar, cores carried thereby, a laterally-extending arm carried by the core-bar, and an auxiliary core detachably secured to said arm.

14. In a device of the class specified, the combination with a mold-box having movable side and end plates, of an auxiliary angle-plate adjustable to a position within the mold-box for the formation of a block having one face at an angle to both the longitudinal and transverse walls of the block, and means for holding said plate in place.

15. In a device of the class specified, the combination with a mold-box having movable side and end plates, of an auxiliary angle-plate adjustable to a position within the mold-box for the formation of a block having one face at an angle to both the longitudinal and transverse walls of the blocks, said angle-plate comprising two integral members arranged at a right angle to each other and supported partly by contact with the movable side and end plates.

16. In a device of the class specified, the combination with a mold-box having hinged side and end sections, of a bed-plate, and horizontally-disposed supporting devices arranged in a plane below the upper surface of the bed and extending from the sides and ends of the bed-plate to afford supports for the sides and end sections when in open position.

17. In a device of the class specified, the combination with a bed-plate, of a plurality of adjustable lugs carried by said bed-plate, means for locking the lugs in adjusted position, and movable side and end plates pivoted to said lugs.

18. In a machine for forming hollow concrete blocks, the combination of the mold having movable sides and ends and provided with a vertically-movable core, of auxiliary plates adapted to be secured to the sides and ends and to the core to form blocks of varying contour.

19. In a machine for forming hollow concrete blocks, the combination with the mold having movable sides and ends, the latter being provided with inwardly-projecting core-sections, of a removable bottom plate having end recesses corresponding in shape to the said end core-sections, and means for effecting the vertical adjustment of said bottom plate.

20. In a machine for forming hollow concrete blocks, the combination of the mold-box having movable sides and ends, a vertically-movable core, a bed-plate, a removable bottom plate, and vertically-adjustable supports carried by the bed-plate and maintaining the removable bottom plate in a plane above that in which said bed-plate is situated.

21. In a machine for forming hollow concrete blocks, the combination of the mold-box having movable sides and ends, cores for the formation of bonding-recesses and other openings in the block, and a removable bottom plate recessed to correspond to the contour of all the cores in the interior of the mold-box when the cores are in position therein.

22. In a machine for forming hollow concrete blocks, the combination with a mold-box having movable sides and ends, core members secured to the ends and adapted to form bonding-recesses in the ends of the molded block, and a vertically-adjustable bottom plate having end recesses for the reception of said core members, substantially as specified.

23. In a device of the class specified, the combination with a mold-box having movable side and end plates, of a core having a removable angular section, and an auxiliary angle-plate adapted to fit the angle of the core and the sides and end of the mold-box.

24. In a device of the class specified, the combination with a mold-box having movable side and end plates, of a vertically-movable core having a detachable angular corner-section, and an auxiliary plate adapted to fit the angle of said core and the sides and end of the box.

25. In a machine for molding hollow, concrete blocks, the combination with a frame having a slot extending substantially from end to end thereof, of a mold having side and end plates mounted on and movable on said frame to open and close the mold, a vertically-reciprocatory core within said mold, and adapted to pass through said slot, means to positively reciprocate said core in said mold, a core-bar on which said core is detachably mounted, and a removable bottom plate within said mold, substantially as described.

26. In a machine for molding hollow, concrete blocks, the combination with a frame, of a mold having side and end plates mounted on and movable on said frame to open and close the mold, a vertically-movable core-carrier, a plurality of detachable cores, mounted on said carrier, said frame having a slot extending substantially from end to end thereof through which the cores pass, and a removable bottom plate within said mold, said bottom plate provided with apertures suited to the size and shape of the respectively registering cores, and means to operate said core-carrier, substantially as described.

27. In a machine for molding hollow, concrete blocks, the combination with a frame of a mold having side and end plates mounted and movable on said frame to open and close the mold of a core-bar, a series of detachable cores mounted on said bar, rack-bars at the opposite ends of said bar and means to actuate said rack-bars, said frame having a slot extending substantially from end to end thereof through which the cores pass, and a removable bottom plate in said box having apertures suited to the size and shape of the cores, substantially as described.

28. In a machine for molding hollow, concrete blocks, the combination with a mold having movable side and end plates, of a removable bracket adapted to form an angular extension of said mold and a vertically-reciprocating core, and means to operate the core, substantially as described.

29. In a machine for molding hollow, concrete blocks, the combination with a frame of a mold having inclosing plates movable to open and close said mold and having a side plate removable from the frame to permit of the formation of an extended corner portion of the mold at the side from which said plate is removable and a vertically-movable core, and means to operate the core, substantially as described.

In testimony that I claim the foregoing as my own I have hereto affixed my signature in the presence of two witnesses.

HARMON S. PALMER.

Witnesses:
J. ROSS COLHOUN,
C. E. DOYLE.